(12) United States Patent
Witteveen

(10) Patent No.: US 12,239,144 B2
(45) Date of Patent: *Mar. 4, 2025

(54) ENCAPSULATION

(71) Applicant: Givaudan SA, Vernier (CH)

(72) Inventor: Frans Witteveen, Leusden (NL)

(73) Assignee: GIVAUDAN SA, Vernier (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,320

(22) Filed: Dec. 1, 2023

(65) Prior Publication Data

US 2024/0099330 A1    Mar. 28, 2024

Related U.S. Application Data

(63) Continuation of application No. 17/560,712, filed on Dec. 23, 2021, now Pat. No. 11,871,764, which is a continuation of application No. 14/699,047, filed on Apr. 29, 2015, now Pat. No. 11,234,451, which is a continuation-in-part of application No. PCT/EP2014/073186, filed on Oct. 29, 2014.

(30) Foreign Application Priority Data

Oct. 30, 2013    (GB) ..................... 1319192

(51) Int. Cl.
| | |
|---|---|
| *A23L 27/00* | (2016.01) |
| *A23G 4/10* | (2006.01) |
| *A23L 27/30* | (2016.01) |
| *A23L 29/212* | (2016.01) |
| *A23L 29/244* | (2016.01) |
| *A23L 29/269* | (2016.01) |

(52) U.S. Cl.
CPC ............... *A23G 4/10* (2013.01); *A23L 27/31* (2016.08); *A23L 27/32* (2016.08); *A23L 27/34* (2016.08); *A23L 27/72* (2016.08); *A23L 27/80* (2016.08); *A23L 29/212* (2016.08); *A23L 29/244* (2016.08); *A23L 29/27* (2016.08); *A23V 2002/00* (2013.01)

(58) Field of Classification Search
None
See application file for complete search history.

(56) References Cited

U.S. PATENT DOCUMENTS

| | | |
|---|---|---|
| 4,143,163 A | 3/1979 | Hutchinson et al. |
| 4,218,262 A | 8/1980 | Warren |
| 4,288,460 A | 9/1981 | Ciliberto et al. |
| 5,624,612 A | 4/1997 | Sewall et al. |
| 5,718,969 A | 2/1998 | Sewall et al. |
| 2008/0110494 A1 | 5/2008 | Dusterhoft et al. |
| 2009/0011115 A1 | 1/2009 | Foss et al. |
| 2011/0020522 A1 | 1/2011 | Emoto |
| 2011/0027412 A1 | 2/2011 | Spence et al. |
| 2011/0265313 A1 | 7/2011 | Ivie et al. |
| 2011/0244083 A1 | 10/2011 | Chen et al. |
| 2015/0064313 A1 | 3/2015 | Witteveen |
| 2015/0230507 A1 | 8/2015 | Witteveen |

FOREIGN PATENT DOCUMENTS

| | | |
|---|---|---|
| CN | 1864540 A1 | 11/2006 |
| WO | 2013156591 A1 | 10/2013 |
| WO | 2013176974 A1 | 11/2013 |

OTHER PUBLICATIONS

PCT/EP2014/073186—International Search Report, mailed Feb. 10, 2015.
PCT/EP2014/073186—International Written Opinion, mailed Feb. 10, 2015.
GB1319192.9—Great Britain Search Report, mailed Apr. 22, 2014.

*Primary Examiner* — Lien T Tran
(74) *Attorney, Agent, or Firm* — Curatolo Sidoti & Trillis Co., LPA; Floyd Trillis, III; Salvatore A. Sidoti

(57) ABSTRACT

An encapsulated flavor, comprising a core material, flavor material and a coating material, the core material comprising a finely-divided native starch, xanthan gum and konjac, the combined weight proportion of the xanthan gum and konjac present in the encapsulated flavour being from about 4% to about 16%, and the relative weight proportions of xanthan gum to konjac being from about 20:80 to about 80:20. The encapsulated flavors may be completely gelatin-free, while retaining the desirable qualities of gelatin.

19 Claims, 1 Drawing Sheet

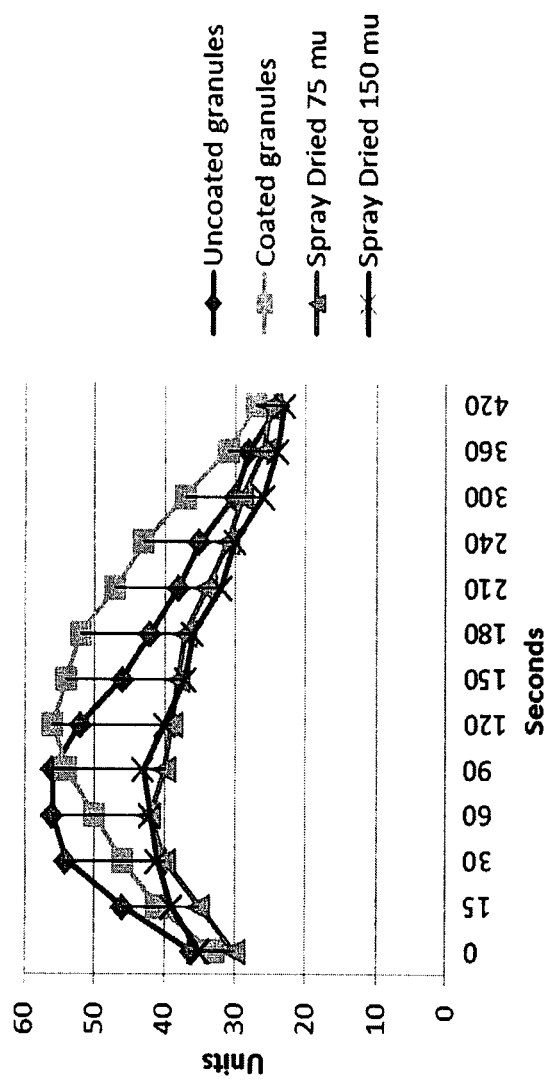

ENCAPSULATION

The present application is a continuation of U.S. patent application Ser. No. 17/560,712, filed on Dec. 23, 2021 Now U.S. Pat. No. 11,871,764, which is a continuation of U.S. patent application Ser. No. 14/699,047, filed on Apr. 29, 2015, now U.S. Pat. No. 11,234,451, which is a continuation-in-part of international patent application PCT/EP2014/073186, filed Oct. 29, 2014, which claims priority to Great Britain Patent Application No. 1313192.9, filed Oct. 30, 2013, which applications are incorporated herein by reference.

This disclosure relates to flavor encapsulation.

The encapsulation of flavors is a very important technology, allowing, as it does, the preservation of flavor until its desired release time. This technology has found its way into a wide variety of consumable compositions, i.e., compositions taken orally, either for ingestion (such as foodstuffs, confectionery, baked goods and beverages) or for spitting out (such as toothpastes and mouthwashes).

One of the most common materials used for this application is gelatin. Gelatin has many advantages; it is cheap and readily available, it also has unique properties with respect to gelling and swelling behaviour, mouth-feel and specific melting behaviour in the mouth upon consumption. These have combined to make its use widespread.

Against these advantages, there have arisen numerous advantages. Gelatin is an animal product, thus meaning that it cannot be used in vegetarian products. In addition, depending on its source, it may involve religious prohibitions. It is hard to overcome kosher and halal prohibitions with gelatin products. However, it has proved difficult to find a substitute for gelatin that can give all its advantages without any of its disadvantages.

It has now been found that it is possible to provide the benefits of gelatin without the drawbacks. There is therefore provided an encapsulated flavor, comprising a core material, flavor material and a coating material, the core material comprising a finely-divided native starch, xanthan gum and konjac, the combined weight proportion of the xanthan gum and konjac present in the encapsulated flavour being from about 4% to about 16%, and the relative weight proportions of xanthan gum to konjac being from about 20:80 to about 80:20.

There is also provided a method of preparing an encapsulated flavor, comprising the blending of a mixture of native starch, xanthan gum and konjac and a flavor emulsion to give a granulate, the combined weight proportion of the xanthan gum and konjac present in the encapsulated flavour being from about 4% to about 16%, and the relative weight proportions of xanthan gum to konjac being from about 20:80 to about 80:20.

Native starches, i.e., non-chemically-modified starches, are well-known and readily-available items of commerce. Typical examples include rice and tapioca starch.

Xanthan gum is a well-known polysaccharide secreted by the bacterium *Xanthomonas campestris*, and it is widely used as a rheology modifier, thickener and stabiliser in foodstuffs and cosmetics.

Konjac is the root of an Asian plant *Amorphophallus konjac*. It is now widely used in health and dietary foods, because of its nutritional content and its high content of glucomannan fibre, which is noted for its swelling ability. It is available in powder (flour) and gel form. Both may be used, but in a particular embodiment the powder form is used.

Although all the materials are well known to the art, it is surprising to find that the combination may be used to replace gelatin and confer on the compositions the desirable qualities of gelatin.

BRIEF DESCRIPTION OF THE DRAWINGS

FIG. 1 is a graph comparing release of the subject encapsulated granulate particles and conventional spray dried particles over time.

The combined weight proportion of the konjac and xanthan gum in the encapsulated flavour is from about 4% to about 16% by weight of the encapsulated flavor, in particular embodiments from 6-14% or 8-12%. The relative weight proportions of xanthan gum to konjac are from about 20:80 to about 80:20, in particular embodiments from 30:70-70:30, 60:40-40:60, 45:55-55:45, 48:52-52:48 and about 50:50.

The flavor may be any suitable desired flavor. It is used in the form of an aqueous emulsion. In some cases, the flavor may be emulsified without the need for any emulsifiers, but in general the presence of at least some food-grade emulsifier is beneficial. Typical examples include gum Arabic, modified food starches and OSA starch (sodium octenyl succinate starch).

In a particular embodiment, the emulsifier is derived from sorbitan. A particular embodiment is polyoxyethylene sorbitan monooleate, commercially available, for example, under the trade names Tween™, Polysorbate™ and Admul™. It has been surprisingly found that the use of these emulsifiers results in emulsifier flavor droplets of unusually small size (down to 1 micron), as opposed to the 3-4 micron size possible with other emulsifiers. The larger the droplets, the greater the flavor loss in the fluidised bed process, so a smaller size brings considerable advantages.

In a typical process, the core material is prepared by mixing the ingredients in a heated fluidised bed. The emulsion of the flavor is then sprayed on to the core material. Spraying is continued until a desired flavor content is attained. Typical fluidised bed equipment include Wurster, rotor granulator and top spray systems.

The fluidised bed equipment is operated according to the normal practices and within the recognised parameters of the art. Typical operating conditions are as follows:

Inlet temperature 60-110° C., particularly about 95° C.,
Product Temperature 35-90° C., particularly about 65° C.,
Air flow rate 20-140 $M^3$/h, particularly about 60 $M^3$/h,
Nozzle air pressure 0.5-6 bar, particularly about 4 bar.

In a further embodiment, at least one protective layer may be applied to the granulate. A protective layer may be any food-grade material capable of forming a coating film, typical examples being cellulosic materials such as methyl and ethyl cellulose, and starch-based materials. This is sprayed as an aqueous solution on to the fluidised flavor granules.

The flavor granules hereinabove described may be used in all kinds of solid and liquid comestible products, that is, products taken by mouth either for ingestion or spitting out. They may be applied to the finished product, or they may be added during its manufacture, for example, to dough, prior to final processing. There is therefore also provided a comestible composition comprising a comestible product base and encapsulated flavor as hereinabove defined.

The comestible products may be solid i.e, a product that is not fluid, i.e., not a liquid or a spreadable paste. Alternatively, they may be liquids or spreadable pastes. By "comestible product base" is meant all of the art-recognised ingredients that are combined with the encapsulated flavor to make a comestible product. These will depend on the nature of the particular product, but they include materials such as other flavors, binders and film-forming materials, thickeners, rheology modifiers, extenders and abrasive agents, solvents and diluents, pigments, dyestuffs and colouring matters, preservatives, flavor enhancers and modifiers, sweeteners, mouthfeel additives, antiseptics and medicinal compounds and compositions, and the like.

Non-limiting examples of comestible products include food products, beverages oral care products, and compositions for admixture to such products, in particular flavor compositions. Flavor compositions may be added to processed foods during their processing, or they may actually be consumables in their own right, e.g. condiments such as sauces and the like.

Further non-limiting examples of comestible products include confectionery products such as chocolate and candy products, snack foods, such as crisps and chips; French fries, cereal products, baker's products, bread products, pasta products both fresh and preserved, gums, chewing gums, yeast products, salt and spice products, mustard products, vinegar products, sauces (condiments), soups, processed foods, cooked fruits and vegetable products, meat and meat products, egg products, edible oils and fat products, medicaments, food extracts, plant extracts, meat extracts, condiments, sweeteners, nutraceuticals, pharmaceutical and non-pharmaceutical gums, tablets, lozenges and drops. Beverages include tea and tea infusions (hot and cold), coffee and cocoa.

Use of the granules hereinabove described confer the possibility of having a gelatin-free product (thus meeting all the religious and dietary problems caused by the presence of gelation) with all the desirable qualities that the presence of gelatin brings. There is therefore also provided a gelatin-free solid comestible composition comprising a comestible product base and encapsulated flavor as hereinabove defined.

The disclosure is further described with reference to the following non-limiting examples.

EXAMPLE 1

Preparation of Particles
The ingredients are shown below:

| Material | Gram |
| --- | --- |
| A | |
| MD12[1] | 175 |
| Gum Arabic | 350 |
| Isomalt[2] | 175 |
| Water | 950 |
| Flavor[3] | 235 |
| Admul T60K[4] | 7 |
| B | |
| Tapioca grits | 150 |
| Xanthan | 50 |
| Konjac | 50 |
| C | |
| Methyl Cellulose | 50 |
| Water | 575 |

[1]Malto Dextrine (dextrose equivalent of 12)
[2]sugar alcohol
[3]Comercially-available peppermint flavor
[4]polyoxyethylene (20) sorbitan monooleate The process was carried out in a rotor granulator operating under the following conditions (with the usual slight practical variations):

| | |
| --- | --- |
| Inlet temperature | 100° C., |
| Product Temperature | 55° C., |
| Air flow | 70 m3/h, |
| Nozzle air pressure | 1 bar. |

Two batches of materials were prepared, the first utilising Stages A and B only ("uncoated granules"), the second additionally utilising C, in which a solution of methyl cellulose is sprayed on to the granules in the fluidised bed ("coated granules"). The same process conditions were maintained for both Stages B and C.

The two sets of granules were then collected and sieved to give granules of 500 μM maximum.

EXAMPLE 2

Testing of Granules.
Both sets of granules were incorporated at 2% by weight into the following chewing gum formulation:

| | |
| --- | --- |
| sorbitol | 56.3 |
| Solsona-T[1] | 30.0 |
| mannitol | 5.0 |
| Malitol syrup[2] | 8.0 |
| lecithin | 0.4 |
| Aspartame[2] | 0.2 |
| Acesulfame-K[2] | 0.1 |

[1]Commercially-available gum base
[2]Sweeteners

The granules were incorporated by using a Z-blade mixer at room temperature and kneading the mix of above ingredients until a homogeneous viscous mix (paste) was formed. The viscous paste was divided in chewing pellets of 1.2 gram each.

For comparison, there was added to the same chewing gum base in the same proportion conventional spray-dried starch flavor particles, carrying the same proportion of the same flavor as those prepared in Example 1. Two different sizes of spray-dried granules were used, of maximum sizes 150 and 75 μm.

Evaluation was carried out by an expert panel of 15 members and the data statistically analysed by ANOVA statistical variance analysis. The results are shown in FIG. 1.

What can clearly be seen from FIG. 1 is that
1. The uncoated granules made as hereinabove described have a rapid and very potent "up-front" release, corresponding to the immediacy of the flavor impact after commencement of chewing;
2. The coated granules have the same impact, but it is delayed by the extra coating.
3. Both substantially outperform the known spray-dried flavor granules.

The invention claimed is:
1. A gelatin-free encapsulated flavor, comprising flavor granules composed of a gelatin-replacer core material, flavor material on the core material and a coating material on the flavor granules, the gelatin-replacer core material comprising a finely-divided native starch, xanthan gum and konjac, the combined proportions of the xanthan gum and konjac by weight of the encapsulated flavor comprising from about 4% to about 16%, and the weight ratio of xanthan gum to konjac comprising from about 20:80 to about 80:20.

2. The encapsulated flavor according to claim 1, wherein the combined proportions of the konjac and xanthan, by weight of the encapsulated flavor, comprises from 6-14%.

3. The encapsulated flavour according to claim 1, wherein the combined proportions of the konjac and xanthan gum, by weight of the encapsulated flavor, comprises from 8-12%.

4. The encapsulated flavour according to claim 1, wherein the weight ratio of xanthan gum to konjac comprises from 30:70-70:30.

5. The encapsulated flavour according to claim 1, wherein the weight ratio of xanthan gum to konjac comprises from 60:40-40:60.

6. The encapsulated flavour according to claim 1, wherein the weight ratio of xanthan gum to konjac comprises from 45:55-55:45.

7. The encapsulated flavour according to claim 1, wherein the weight ratio of xanthan gum to konjac comprises from 48:52-52:48.

8. The encapsulated flavour according to claim 1, wherein the weight ratio of xanthan gum to konjac comprises about 50:50.

9. The encapsulated flavour according to claim 1, wherein the flavor material contains an emulsifier derived from sorbitan.

10. The encapsulated flavour according to claim 9, wherein the emulsifier comprises polyoxyethylene sorbitan monostearate.

11. The encapsulated flavour according to claim 1, wherein the coating material comprises a cellulosic material.

12. The encapsulated flavour according to claim 11, wherein the cellulosic material comprises methyl cellulose.

13. The encapsulated flavour according to claim 11, wherein the cellulosic material comprises ethyl cellulose.

14. The encapsulated flavour according to claim 1, wherein the coating material comprises a starch-based material.

15. A method of preparing a gelatin-free encapsulated flavor, comprising
   (a) blending a mixture of native starch, xanthan gum and konjac in a fluidised bed to prepare a gelatin-replacer core material;
   (b) spraying a flavor emulsion comprising an emulsifier on to the gelatin-replacer core material to give fluidised flavor granules; and
   (c) spraying an aqueous solution of a food-grade coating material on to the fluidised flavor granules,
   the combined proportions of the xanthan gum and konjac, by weight of the encapsulated flavor comprising from about 4% to about 16%, and the weight ratio of xanthan gum to konjac comprising from about 20:80 to about 80:20.

16. The method according to claim 15, in which the emulsifier is derived from sorbitan.

17. The method according to claim 16, in which the emulsifier comprises polyoxyethylene sorbitan monostearate.

18. A solid comestible composition comprising a comestible product base and the encapsulated flavor according to claim 1.

19. The solid comestible composition according to claim 18, which is completely gelatin-free.

* * * * *